United States Patent
Subramaniam

(10) Patent No.: US 9,870,717 B2
(45) Date of Patent: Jan. 16, 2018

(54) ASSISTING A VISUALLY IMPAIRED USER TO GRIP AN OBJECT

(71) Applicant: HCL Technologies Limited, Noida, Uttar Pradesh (IN)

(72) Inventor: Mahesh Subramaniam, Bangalore (IN)

(73) Assignee: HCL TECHNOLOGIES LIMITED, Noida (IN)

(*) Notice: Subject to any disclaimer, the term of this patent is extended or adjusted under 35 U.S.C. 154(b) by 0 days.

(21) Appl. No.: 15/444,813

(22) Filed: Feb. 28, 2017

(65) Prior Publication Data

US 2017/0287360 A1     Oct. 5, 2017

(30) Foreign Application Priority Data

Mar. 30, 2016    (IN) .............................. 201611011175

(51) Int. Cl.
    *G09B 21/00*     (2006.01)
    *G06K 9/62*     (2006.01)
    *G06F 17/30*     (2006.01)
    *A41D 19/00*     (2006.01)
    *A41D 1/00*     (2006.01)

(52) U.S. Cl.
    CPC ........... *G09B 21/006* (2013.01); *A41D 1/002* (2013.01); *A41D 19/00* (2013.01); *G06F 17/3028* (2013.01); *G06F 17/30268* (2013.01); *G06F 17/30769* (2013.01); *G06K 9/6202* (2013.01)

(58) Field of Classification Search
    CPC .... G06F 3/0481; G06F 3/048; G06F 3/04812; G06F 1/163; A61M 2205/582
    See application file for complete search history.

(56) References Cited

U.S. PATENT DOCUMENTS

| | | | | |
|---|---|---|---|---|
| 2005/0099503 A1* | 5/2005 | Kitabayashi | ............ | G06F 3/014 348/211.99 |
| 2008/0167662 A1* | 7/2008 | Kurtz | ..................... | A61B 34/70 606/130 |
| 2008/0170776 A1* | 7/2008 | Albertson | ............... | G06F 21/35 382/154 |

OTHER PUBLICATIONS

Akella.S.Narasimha Raju et. al., "Perceptible Path Organism in Support of Visually Impaired People", [IJESAT] International Journal of Engineering Science & Advanced Technology, Jul. 2012, From p. No. 932-940, vol. 2, Issue-4.

* cited by examiner

*Primary Examiner* — Edward Park
(74) *Attorney, Agent, or Firm* — HM Law Group LLP; Vani Moodley, Esq.

(57) ABSTRACT

The present disclosure relates to system(s) and device for assisting a visually impaired user to grip objects. The system may receive an image of an object in real-time and identify a reference image corresponding to the image by comparing the image with reference images. Further, the system may identify a reference tactile image corresponding to the reference image and generate a first set of audio instructions for assisting the visually impaired user to grip the object based on the reference tactile image. Further, the system may receive a tactile image from a tactile glove of the visually impaired user and compare the tactile image with the reference tactile image to identify pressure variation data. Furthermore, the system may generate a second set of audio instructions for guiding the visually impaired user to grip the object base on a second set of audio instructions generated using the pressure variation data.

13 Claims, 3 Drawing Sheets

ASSISTING A VISUALLY IMPAIRED USER TO GRIP AN OBJECT

CROSS-REFERENCE TO RELATED APPLICATIONS AND PRIORITY

The present application claims priority from Indian Patent Application No. 201611011175, filed on Mar. 30, 2016, the entirety of which is hereby incorporated by reference.

TECHNICAL FIELD

The present disclosure in general relates to the field of navigation. More particularly, the present invention relates to a system and method for assisting a visually impaired user to grip an object.

BACKGROUND

Visually Impaired people not only need help in seeking direction, but also need help in handling things they use daily or encounter during day to day activities. The Visually Impaired people need to grip objects in the right way, apply adequate pressure and grip the objects/tools such as a can opener or opening the door or lifting an object. In some situations, if the visually impaired user encounters objects for first time and they need to be told the right pressure to be applied on the object. Once they are familiar with the object, they need no external assistance since they would have already experienced operating the equipment and would remember to use the right force.

Similarly, in a manufacturing environment, quality control of assembly line products can be done by visually impaired where they are repeatedly required to check for uniformity of the shape of objects and need to do it without errors. In such a quality control process, the visually impaired user should be able to detect even minor variations in shape on all inspected assembled material.

The systems available in the art are only configured to assist the users in determining the object in front of them. However, this information is not sufficient enough for the visually impaired user to grip the object.

SUMMARY

This summary is provided to introduce aspects related to device, systems and methods for assisting a visually impaired user in gripping an object and the aspects are further described below in the detailed description. This summary is not intended to identify essential features of the claimed subject matter nor is it intended for use in determining or limiting the scope of the claimed subject matter.

In one embodiment, a system for assisting a visually impaired user to grip objects is illustrated. The system comprises a memory and a processor coupled to the memory. The processor is configured to execute program instructions stored in the memory. The processor may execute programmed instructions stored in the memory to receive an image of an object in real-time and identify a reference image corresponding to the image by comparing the image with reference images present in a database. Further, the processor may execute programmed instructions stored in the memory to identify a reference tactile image corresponding to the reference image, wherein the reference tactile image is stored in the database. Further, the processor may execute programmed instructions stored in the memory to generate a first set of audio instructions for assisting the visually impaired user to grip the object based on the reference tactile image. Further, the processor may execute programmed instructions stored in the memory to receive a tactile image from a tactile glove put on by the visually impaired user. Further, the processor may execute programmed instructions stored in the memory to compare the tactile image with the reference tactile image to identify pressure variation data corresponding to one or more points in the tactile image and the reference tactile image. Furthermore, the processor may execute programmed instructions stored in the memory to generate a second set of audio instructions for guiding the visually impaired user to grip the object base on a second set of audio instructions, wherein the second set of audio instructions are generated based on the pressure variation data.

In one embodiment, a device for assisting a visually impaired user to grip an object is illustrated. The device comprises a camera mounted over a wearable device, and a central processing unit coupled to the camera and tactile gloves. The central processing unit comprises a memory and a processor coupled to the memory. The processor is configured to execute program instructions stored in the memory. The processor may execute programmed instructions stored in the memory to receive an image of an object in real-time from the camera and identify a reference image corresponding to the image by comparing the image with reference images present in a database. Further, the processor may execute programmed instructions stored in the memory to identify a reference tactile image corresponding to the reference image, wherein the reference tactile image is stored in the database. Further, the processor may execute programmed instructions stored in the memory to generate a first set of audio instructions for assisting the visually impaired user to grip the object based on the reference tactile image. Further, the processor may execute programmed instructions stored in the memory to receive a tactile image from a tactile glove put on by the visually impaired user. Further, the processor may execute programmed instructions stored in the memory to compare the tactile image with the reference tactile image to identify pressure variation data corresponding to one or more points in the tactile image and the reference tactile image. Furthermore, the processor may execute programmed instructions stored in the memory to generate a second set of audio instructions for guiding the visually impaired user to grip the object base on a second set of audio instructions, wherein the second set of audio instructions are generated based on the pressure variation data.

In one embodiment, a non-transitory computer readable medium embodying a program executable in a computing device for assisting a visually impaired user to grip an object is disclosed. The program comprises a program code for receiving an image of an object in real-time from the camera and identifying a reference image corresponding to the image by comparing the image with reference images present in a database. The program comprises a program code for identifying a reference tactile image corresponding to the reference image, wherein the reference tactile image is stored in the database. The program comprises a program code for generating a first set of audio instructions for assisting the visually impaired user to grip the object based on the reference tactile image. The program comprises a program code for receiving a tactile image from a tactile glove put on by the visually impaired user. The program comprises a program code for comparing the tactile image with the reference tactile image to identify pressure variation data corresponding to one or more points in the tactile image and the reference tactile image. The program comprises a program code for generating a second set of audio instructions for guiding the visually impaired user to grip the object base on a second set of audio instructions, wherein the second set of audio instructions are generated based on the pressure variation data.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1A:
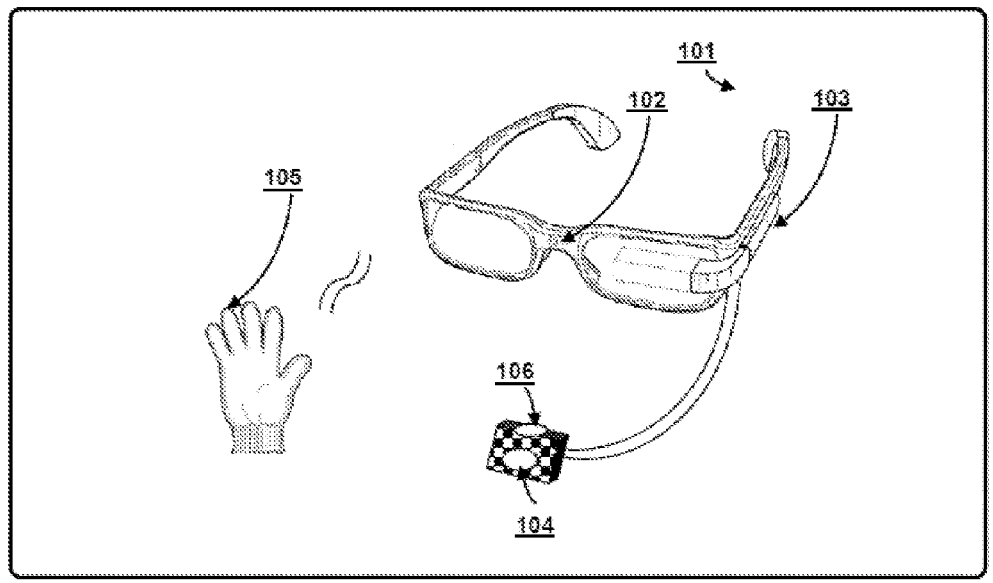
FIG. 1a and FIG. 1b illustrates a network implementation of a smart glass for assisting a visually impaired user to grip an object, in accordance with an embodiment of the present subject matter.

The present subject matter relates to a device and system for assisting a visually impaired user to grip objects. The system comprises a memory and a processor coupled to the memory, wherein the processor is configured to execute program instructions stored in the memory. In one embodiment, the processor may execute programmed instructions stored in the memory to receive an image of an object in real-time. The image may be captured by a camera mounted over a wearable device. Further, the processor is configured to identify a reference image corresponding to the image by comparing the image with reference images present in a database.

Further, the processor may execute programmed instructions stored in the memory to identify a reference tactile image corresponding to the reference image, wherein the reference tactile image is stored in the database. The reference tactile image is configured to store pressure data for operating the object. The pressure data corresponds to a set of objects, wherein the pressure data is captured by tactile gloves put on by a user operating the objects. The set of objects may include apparatus, drawers, doors, taps, switches, and other household devices and goods. A user with good eyesight may put on the tactile gloves and the wearable device with the camera to capture the reference image and tactile image corresponding to each object from the set of objects. The reference image and tactile image corresponding to each object is then stored in the database at the wearable device or the memory of system.

Further, the processor may execute programmed instructions stored in the memory to generate a first set of audio instructions for assisting the visually impaired user to grip the object based on the reference tactile image. In one embodiment, the tactile gloves may be enabled with a set of tactile pressure sensors installed thereon. When an object is gripped using tactile gloves, the forces experienced on sensors are transmitted to create an image called the reference tactile image. In one embodiment, the processor may determine pressure exerted at each finger of the tactile glove and accordingly generates the first set of audio instructions for assisting the visually impaired user.

Further, the processor may execute programmed instructions stored in the memory to receive a tactile image from a tactile glove put on by the visually impaired user. Further, the processor may execute programmed instructions stored in the memory to compare the tactile image with the reference tactile image to identify pressure variation data corresponding to one or more points in the tactile image and the reference tactile image. Based on the pressure variation data, the processor may generate a second set of audio instructions for guiding the visually impaired user to grip the object.

In one embodiment, the system is enabled over a smart glass. In one embodiment, the smart glass is enabled with a camera for capturing images of objects in front of the visually impaired user. The smart glass is enabled with a central processing unit comprising a memory and a processor. The central processing unit is in communication with a pair of tactile gloves, either physically or wirelessly over Bluetooth. A tactile image is created when an object is gripped by the visually impaired user. The processor in the smart glass is configured to record the reference tactile image along with reference image, using tactile gloves and camera, for each object from a set of objects. Further, the processor stores the reference image and reference tactile image corresponding to each object in the memory. The storing of reference image and reference tactile image are controlled by human voice. The image may be saved only when a user is wearing the smart glass and tactile gloves. In one embodiment, a Natural Language Processing (NLP) module on the central processing unit identifies the human voice (like 'Save' or 'ok to copy') and accordingly stores the image.

The next time a visually impaired user request to check/grip an object in front of him, the camera captures the image of object. Further, the processor in the smart glass is configured to compare the image with reference image stored in database and fetch a tactile image corresponding to the image. Based on the reference tactile image, the processor generates a first set of audio instructions to guide the user on how to apply pressure on object and grip it.

In one embodiment, the processor monitors the tactile gloves and determines the tactile image captured from the tactile gloves of the visually impaired user in real-time. The processor is further configured to compare the tactile image with reference tactile image using pattern recognition algorithm and generate a second set of audio instructions to correctly grip the object, if the object is not gripped properly by the visually impaired user. The processor in the smart glass is configured to insure that the object is gripped exactly similar to the reference image. In one embodiment, the processor is configured to maintain the database in the memory for storing the reference image and the corresponding reference tactile image.

In one embodiment, the process of assisting a visually impaired user to grip an object starts by generating the database storing reference images and reference tactile images. The operation of recording the reference images and reference tactile images is performed by a user with normal vision. The user may wear the smart glass and tactile gloves to grip and hold the set of objects. The visually impaired user may also record the reference images and reference tactile images. In one embodiment, the user focuses the glass camera on the object to capture the reference image. The object image can be captured from different elevation so it easy to detect the object. In one embodiment, a FFT (Fast Fourier Transform) of image is also stored in the database. Further, by gripping the object appropriately by a user with normal vision, the reference tactile image is generated. The tactile glove provides the quantum of pressure from all its sensors to the processor. In one embodiment, only when commanded by user, the reference images and reference tactile images are stored.

Once the database is generated, in the next step, the visually impaired user may use the tactile gloves and the smart glasses that has database containing the reference images and reference tactile images of a set of objects to grip an object. The camera of the smart glass may capture the image of object in front of user and using pattern recognition algorithm identifies a reference image from the database. The pattern recognition may be performed using FFT.

Further, the processor is configured to retrieve the reference tactile image corresponding to the reference image. The processor then converts the reference tactile image into quantum of pressure to be applied by fingers, palm or wrist. The output from processor is sent as first set of instructions to visually impaired user through a speaker of the smart glasses. For example, the first set of instructions may be "slide the object till end of your palm and press the first finger to the right"

Once the user begins to grip the object, the processor is configured to monitor the tactile image generated by the tactile glove put on by the visually impaired user and compare tactile image with the reference tactile image. Based on the comparison, the second set of audio instructions are generated to instruct the user to grip object the right way till both tactile image and reference tactile image are matching within a pre-defined margin/tolerance. For example, after gripping the object, processor may generate second set of instructions such as "hold your thumb to object" or "move index finger to left". In one embodiment, the pre-defined margin/tolerance is configurable and limit may be based on comfort level of visual impaired user. In higher version of embodiment, limit can be automatically adjusted.

While aspects of described system and method for assisting a visually impaired user to grip an object may be implemented in any number of different computing systems, environments, and/or configurations, the embodiments are described in the context of the following exemplary system.

Figure 1B:
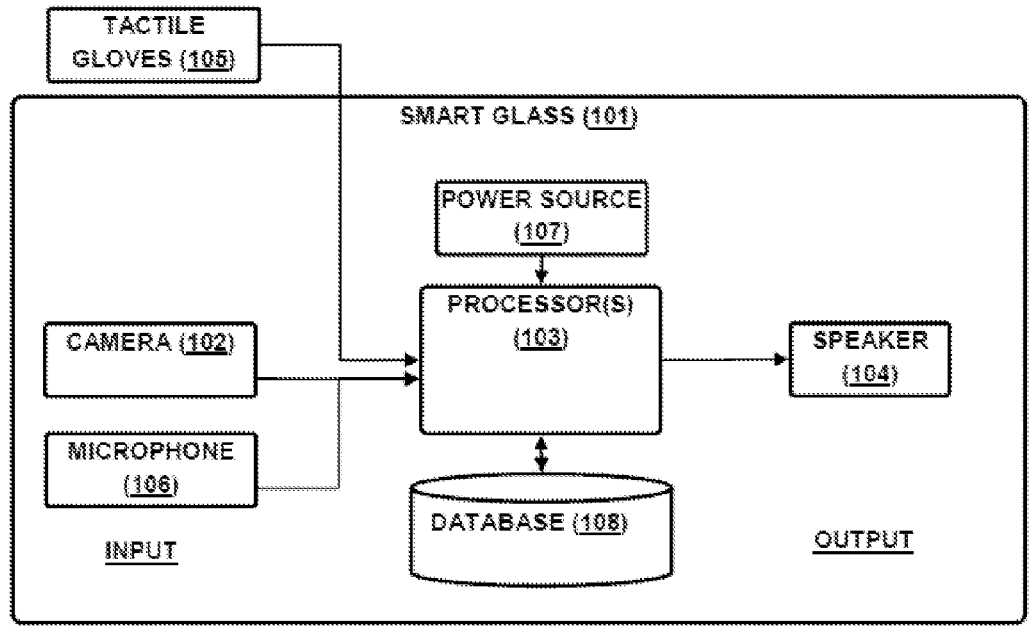

Referring now to FIG. 1, the inputs provided to a smart glass 101 and outputs generated by the smart glass 101 for assisting a visually impaired user are described. Further, tactile gloves 105 worn by the visually impaired user, are configured to transmit a signal wirelessly to the controller/processor 103 in the smart glass 101. The smart glass 101 worn by the visually impaired user is enabled with a camera 102 mounted on it to capture images of objects in front of the visually impaired user and send the captured image to the processor 103. The smart glass 101 is further enabled with a speaker 104 and a microphone 106. In one embodiment, the visually impaired user may request the tactile image to be saved by providing voice commands such as "Save image" or "Check object" using the microphone 106. The speaker 104 instructs the visually impaired user to grip the object, based on the object in front of the user and the stored tactile image corresponding to the object. The visual object and tactile image are stored in database (108). The smart glass 103 are powered by rechargeable power source (lithium battery) 107. FIG. 1b is block diagram of the system with tactile gloves 105 and smart glass 101. The process of assisting a visually impaired user to grip an object is further elaborated with respect to FIG. 2.

Figure 2:
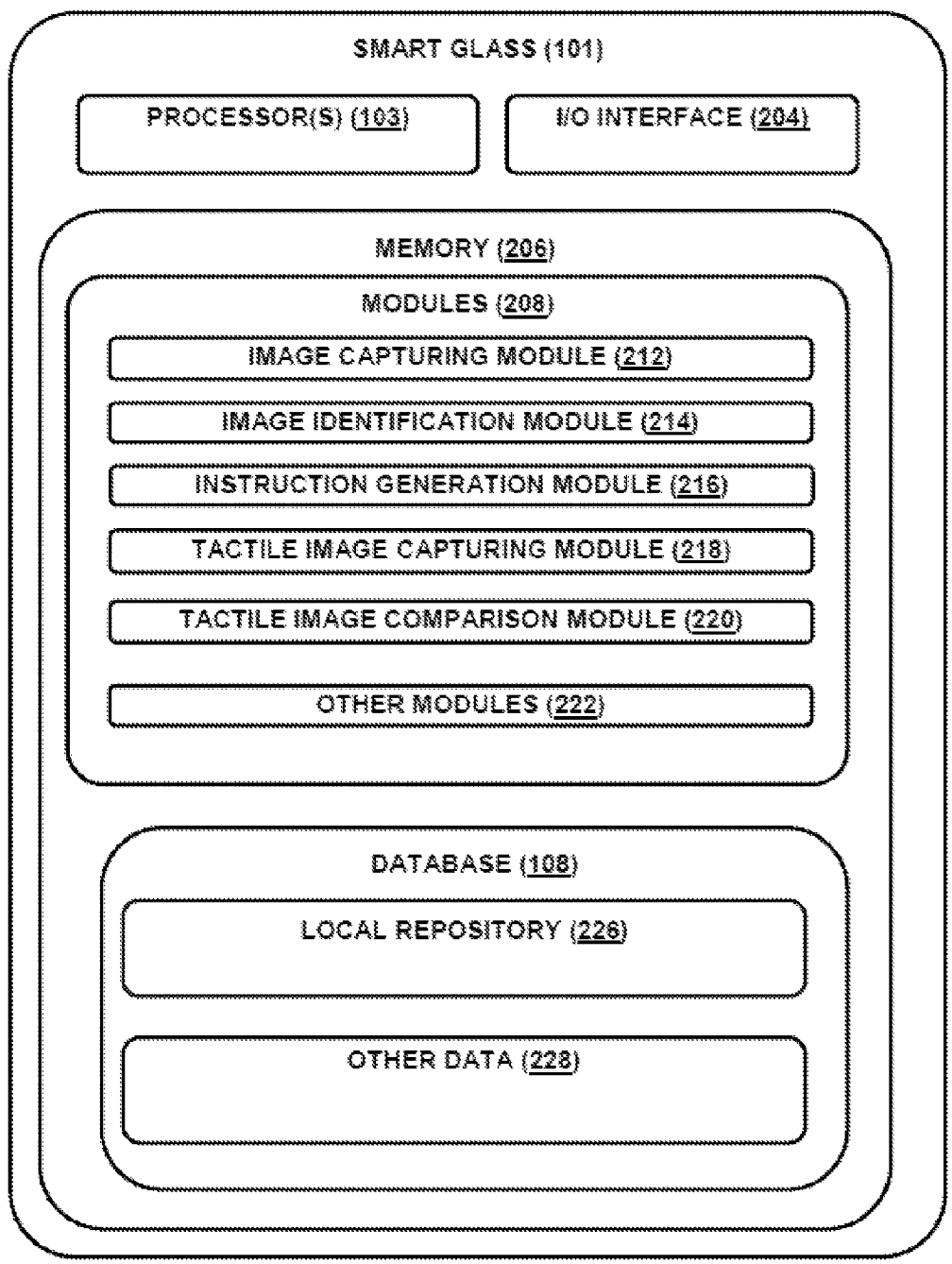
FIG. 2 illustrates the smart glass for assisting a visually impaired user to grip an object, in accordance with an embodiment of the present subject matter.

Referring now to FIG. 2, the Smart glass 101 is illustrated in accordance with an embodiment of the present subject matter. In one embodiment, the smart glass 101 may include at least one processor 103, an input/output (I/O) interface 204, and a memory 206. The at least one processor 103 may be implemented as one or more microprocessors, microcomputers, microcontrollers, digital signal processors, central processing units, state machines, logic circuitries, and/or any devices that manipulate signals based on operational instructions. Among other capabilities, the at least one processor 103 is configured to fetch and execute computer-readable instructions stored in the memory 206. Further, the smart glass 101 is enabled with the database 108, wherein the database 108 is generated and maintained in the memory 206

The I/O interface 204 may include a variety of software and hardware interfaces, to interact with tactile gloves 105, camera 102 and speaker 104 and microphone 106.

The modules 208 include routines, programs, objects, components, data structures, etc., which perform particular tasks, functions or implement particular abstract data types. In one implementation, the modules 208 may include an image capturing module 212, an image identification module 214, an instruction generation module 216, a tactile image capturing module 218, a tactile image comparison module 220, and other modules 222. The other modules 222 may include programs or coded instructions that supplement applications and functions of the smart glass 101. The database 108, amongst other things, serves as a repository for storing data processed, received, and generated by one or more of the modules 208. The database 108 may also include a local repository 226, and other data 228. In one embodiment, the local repository 226 is configured to maintain a database storing a reference image and reference tactile image corresponding to each object of a set of objects.

In one implementation, the image capturing module 212 is configured to receive an image of an object in real-time. The image may be captured by the camera 102 mounted over the smart glass 101. The smart glass 101 may be put on by the visually impaired user. The image may be captured based on the instructions provided by the user to capture the image. The image may be received in any image format such as .JPG, .PNG, and the like.

Further, the image identification module 214 is configured to identify a reference image corresponding to the image by comparing the image with reference images present in a database. The comparison is performed using image pattern matching. The image pattern matching may be based on FFT (Fast Fourier Transform). For the purpose of FFT (Fast Fourier Transform), the image and the reference images may be processed first using FFT (Fast Fourier Transform) and then compared to identify a reference image corresponding to the image received from the camera 102.

Further, the image identification module 214 is configured to identify a reference tactile image corresponding to the reference image from the database. The reference image and reference tactile image are stored in the form of a pair corresponding to a particular object. The reference tactile image is configured to store pressure data for operating the object. The pressure data corresponding to a set of objects, wherein the pressure data is captured by tactile gloves 105 put on by a user operating the objects. The set of objects may include utensils, drawers, doors, taps, switches, and other household goods. A user with good eyesight may put on the tactile gloves 105 and the camera 102 to capture the reference image and tactile image and generate the database 108 with reference images and reference tactile images.

Further, the instruction generation module 216 may generate a first set of audio instructions for assisting the visually impaired user to grip the object based on the reference tactile image. The instruction generation module 216 converts the reference tactile image into quantum of pressure to be applied by fingers, palm or wrist. The output from instruction generation module 216 is sent as first set of instructions to visually impaired user through the speaker 104. For example, the first set of instructions may be "slide the object till end of your palm and press the first finger to the right."

Further, the tactile image capturing module 218 is configured to receive a tactile image from tactile gloves 105 put on by the visually impaired user in real-time. In one embodiment, the tactile gloves 105 may be enabled with a set of tactile pressure sensors installed thereon. When an object is gripped using tactile gloves 105, the forces experienced on sensors are transmitted to create an image called the tactile image. In one embodiment, the tactile image capturing module 218 may determine pressure exerted at each finger of the tactile glove 105 and accordingly generate the tactile image.

Further, the tactile image comparison module 220 compare the tactile image with the reference tactile image to identify pressure variation data corresponding to one or more points in the tactile image and the reference tactile image. Once the user begins to grip the object, the instruction generation module 216 is configured to monitor the tactile image generated by the tactile gloves 105 put on by the visually impaired user and compare tactile image with the reference tactile image to generate the pressure variation data.

Further, based on the pressure variation data, instruction generation module 216 may generate a second set of audio instructions for guiding the visually impaired user to grip the object. Further, based on the comparison, the second set of audio instructions are generated to instruct the user to grip object the right way till both tactile image and reference tactile image are matching within a pre-defined margin/tolerance. For example, after gripping the object, the processor 103 may generate second set of instructions such as "hold your thumb to object" or "move index finger to left". The method for assisting a visually impaired user to grip an object is further illustrated with respect to the block diagram of FIG. 3.

Figure 3:
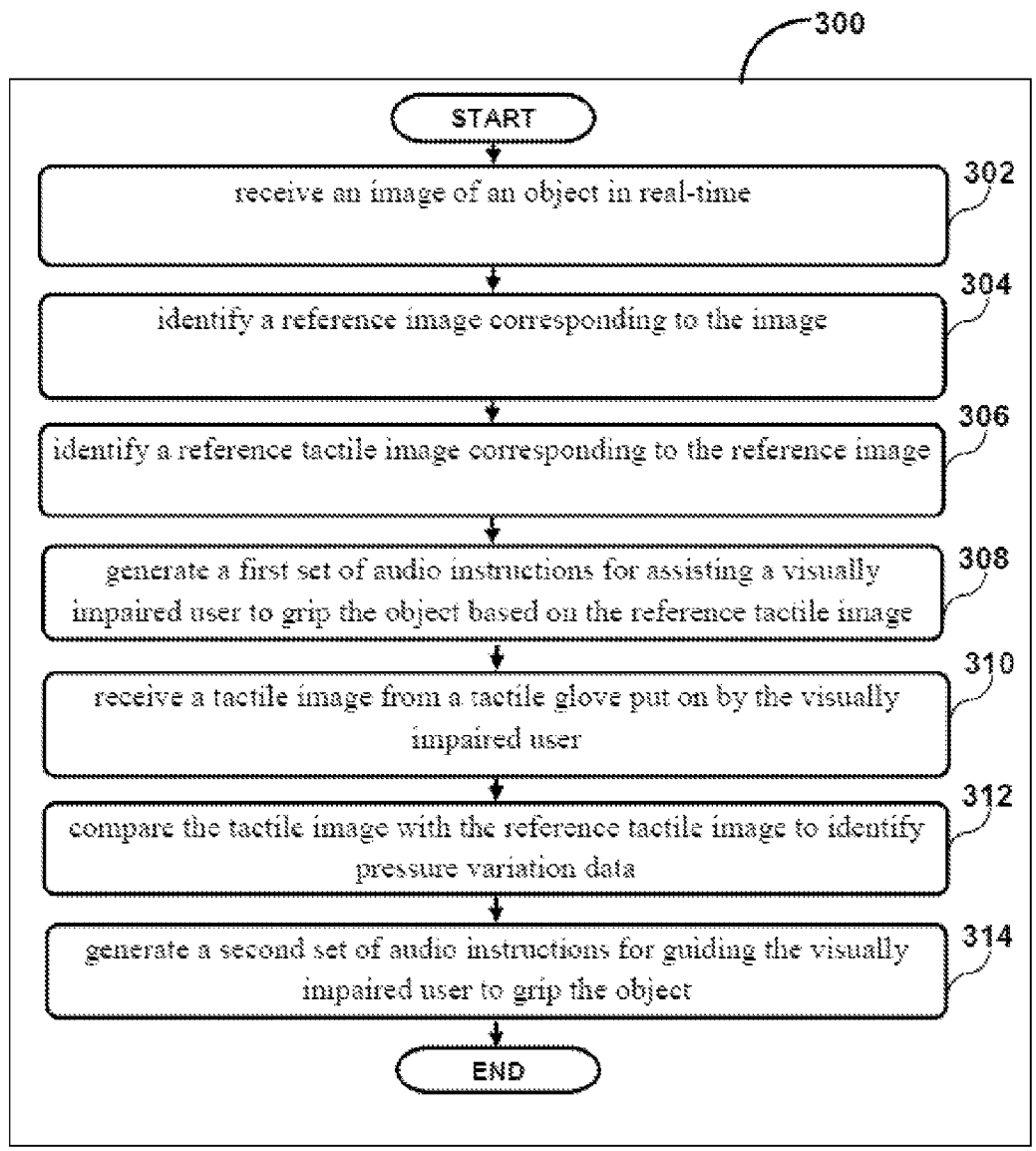
FIG. 3 illustrates a flow diagram for assisting a visually impaired user to grip an object using the smart glass, in accordance with an embodiment of the present subject matter.

Referring now to FIG. 3, a method 300 for assisting a visually impaired user to grip an object is disclosed, in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 may be considered to be implemented in the above described system 102.

At block 302, the image capturing module 212 is configured to receive an image of an object in real-time. The image may be captured by the camera 102 mounted over the smart glass 101. The smart glass 101 may be put on by the visually impaired user. The image may be captured based on the instructions provided by the user to capture the image. The image may be received in any image format such as .JPG, .PNG, and the like.

At block 304, the image identification module 214 is configured to identify a reference image corresponding to the image by comparing the image with reference images present in the database 108. The comparison is performed using image pattern matching. The image pattern matching may be based on FFT (Fast Fourier Transform). For the purpose of FFT (Fast Fourier Transform), the image and the reference images may be processed first using FFT (Fast Fourier Transform) and then compared to identify a reference image corresponding to the image received from the camera 102.

At block 306, the image identification module 214 is configured to identify a reference tactile image corresponding to the reference image from the database 108. The reference image and reference tactile image are stored in the form of a pair corresponding to a particular object. The reference tactile image is configured to store pressure data for operating the object. The pressure data corresponding to a set of objects, wherein the pressure data is captured by tactile gloves 105 put on by a user operating the objects. The set of objects may include utensils, drawers, doors, taps, switches, and other household goods. A user with good eyesight may put on the tactile gloves 105 and the camera 102 to capture the reference image and tactile image and generate the database 108 with reference images and reference tactile images.

At block 308, the instruction generation module 216 may generate a first set of audio instructions for assisting the visually impaired user to grip the object based on the reference tactile image. The instruction generation module 216 converts the reference tactile image into quantum of pressure to be applied by fingers, palm or wrist. The output from instruction generation module 216 is sent as first set of instructions to visually impaired user through the speaker 104. For example, the first set of instructions may be "slide the object till end of your palm and press the first finger to the right."

At block 310, the tactile image capturing module 218 is configured to receive a tactile image from the tactile gloves 105 put on by the visually impaired user in real-time. In one embodiment, the tactile gloves 105 may be enabled with a set of tactile pressure sensors installed thereon. When an object is gripped using tactile gloves 105, the forces experienced on sensors are transmitted to create an image called the tactile image. The tactile image corresponds to pressure exerted at one or more points of the tactile gloves 105 while operating the object. In one embodiment, the tactile image capturing module 218 may determine pressure exerted at each finger of the tactile gloves 105 and accordingly generate the tactile image.

At block 312, the tactile image comparison module 220 compare the tactile image with the reference tactile image to identify pressure variation data corresponding to one or more points in the tactile image and the reference tactile image. Once the user begins to grip the object, the instruction generation module 216 is configured to monitor the tactile image generated by the tactile gloves 105 put on by the visually impaired user and compare tactile image with the reference tactile image to generate the pressure variation data.

At block 314, the based on the pressure variation data, the instruction generation module 216 may generate a second set of audio instructions for guiding the visually impaired user to grip the object. Further, based on the comparison, the second set of audio instructions are generated to instruct the user to grip object the right way till both tactile image and reference tactile image are matching within a pre-defined margin/tolerance. For example, after gripping the object, the processor 103 may generate second set of instructions such as "hold your thumb to object" or "move index finger to left".

Although implementations for methods and systems for assisting a visually impaired user to grip an object has been described, it is to be understood that the appended claims are not necessarily limited to the specific features or methods described. Rather, the specific features and methods are disclosed as examples of implementations for assisting a visually impaired user.

I claim:

1. A device configured for assisting a visually impaired user to grip an object, the device comprising:
a camera;
a central processing unit, comprising:
a memory; and
a processor coupled to the memory, wherein the processor is configured to execute program instructions stored in the memory to:
receive an image of an object in real-time, wherein the image is captured by the camera;
identify a reference image corresponding to the image by comparing the image with reference images present in a database;
identify a reference tactile image corresponding to the reference image, wherein the reference tactile image is stored in the database;
generate a first set of audio instructions for assisting a visually impaired user to grip the object based on the reference tactile image;
receive a tactile image from a tactile glove put on by the visually impaired user;
compare the tactile image with the reference tactile image to identify pressure variation data corresponding to one or more points in the tactile image and the reference tactile image; and
generate a second set of audio instructions for guiding the visually impaired user to grip the object, wherein the second set of audio instructions is generated based on the pressure variation data.

2. The device of claim 1, wherein the tactile image corresponds to pressure exerted at one or more points of the tactile gloves while operating the object.

3. The device of claim 1, further configured to maintain a database storing reference image and reference tactile image corresponding to each object of a set of objects, wherein each reference image is configured to store visual data of the object, and wherein each reference tactile image is configured to store pressure data for operating the object.

4. The device of claim 1, wherein the camera is mounted over a wearable device of a visually impaired user.

5. The device of claim 1, wherein the image is compared with reference images using image pattern matching.

6. The device of claim 1, wherein the first set of audio instructions and second set of audio instructions are provided to the visually impaired user through a speaker on the wearable device.

7. A system for assisting a visually impaired user to grip an object, the system comprising:
a memory; and
a processor coupled to the memory, wherein the processor is configured to execute program instructions stored in the memory to:
receive an image of an object in real-time;
identify a reference image corresponding to the image by comparing the image with reference images present in a database;
identify a reference tactile image corresponding to the reference image, wherein the reference tactile image is stored in the database;
generate a first set of audio instructions for assisting the visually impaired user to grip the object based on the reference tactile image;
receive a tactile image from a tactile glove put on by the visually impaired user;
compare the tactile image with the reference tactile image to identify pressure variation data corresponding to one or more points in the tactile image and the reference tactile image; and
generate a second set of audio instructions for guiding the visually impaired user to grip the object base on a second set of audio instructions, wherein the second set of audio instructions are generated based on the pressure variation data.

8. The system of claim 7, wherein the tactile image corresponds to pressure exerted at one or more points of the tactile gloves while operating the object.

9. The system of claim 7, further configured to maintain a database storing reference image and reference tactile image corresponding to each object of a set of objects, wherein each reference image is configured to store visual data of the object, and wherein each reference tactile image is configured to store pressure data for operating the object.

10. The system of claim 7, wherein the image is captured by a camera mounted over a wearable device of a visually impaired user.

11. The system of claim 7, wherein the image is compared with reference images using image pattern matching.

12. The system of claim 7, wherein the first set of audio instructions and second set of audio instructions are provided to the visually impaired user through a speaker on the wearable device.

13. A non-transitory computer readable medium embodying a program executable in a computing device for assisting a visually impaired user to grip an object, the computer program product comprising:
a program code for receiving an image of an object in real-time;
a program code for identifying a reference image corresponding to the image by comparing the image with reference images present in a database;
a program code for identifying a reference tactile image corresponding to the reference image, wherein the reference tactile image is stored in the database;
a program code for generating a first set of audio instructions for assisting the visually impaired user to grip the object based on the reference tactile image;
a program code for receiving a tactile image from a tactile glove put on by the visually impaired user;

a program code for comparing the tactile image with the reference tactile image to identify pressure variation data corresponding to one or more points in the tactile image and the reference tactile image; and a program code for generating a second set of audio instructions for guiding the visually impaired user to grip the object base on a second set of audio instructions, wherein the second set of audio instructions are generated based on the pressure variation data.

* * * * *